United States Patent [19]
Delprat

[11] Patent Number: 5,511,072
[45] Date of Patent: Apr. 23, 1996

[54] METHOD, TERMINAL AND INFRASTRUCTURE FOR SHARING CHANNELS BY CONTROLLED TIME SLOT STEALING IN A MULTIPLEXED RADIO SYSTEM

[75] Inventor: Marc Delprat, Le Chesnay, France

[73] Assignee: Alcatel Mobile Communication France, Paris, France

[21] Appl. No.: 299,654

[22] Filed: Sep. 2, 1994

[30]    Foreign Application Priority Data

Sep. 6, 1993 [FR] France ................................. 93 10567

[51] Int. Cl.⁶ ..................................................... H04J 3/16
[52] U.S. Cl. ...................... 370/68.1; 370/95.1; 370/95.3; 370/110.1; 379/63; 455/33.1; 455/56.1; 455/67.1
[58] Field of Search ................................. 370/95.1, 95.2, 370/95.3, 81, 82, 85.2, 85.6, 85.7, 91, 94.2, 110.1, 111; 340/825.5, 825.51, 825.06; 379/58, 59, 63; 455/33.1, 34.1, 34.2, 53.1, 54.1, 56.1, 67.1

[56]          References Cited

U.S. PATENT DOCUMENTS

| | | | |
|---|---|---|---|
| 5,237,570 | 8/1993 | Smolinske et al. ................. | 370/95.1 |
| 5,245,610 | 9/1993 | Lindell ................................. | 370/95.1 |
| 5,278,832 | 1/1994 | Binzel et al. ....................... | 370/95.1 |
| 5,282,204 | 1/1994 | Shpancer et al. .................. | 370/95.1 |
| 5,297,142 | 3/1994 | Paggeot et al. .................... | 370/95.1 |
| 5,398,247 | 3/1995 | Delprat et al. ..................... | 370/95.1 |

FOREIGN PATENT DOCUMENTS

0171596A2  2/1986  European Pat. Off. .
WO9102436  2/1991  WIPO .

OTHER PUBLICATIONS

Wong et al, "Blank and Burst Transmission of Data Over Active Speech Channels", *Electronics Letters*, vol. 24, No. 11, May 26, 1988 pp. 670–672.
Steele et al, "Mobile Radio Communications", 1992 Pentech Press, pp. 707, 714, 756.
French Search Report FR 90310567.

*Primary Examiner*—Alpus H. Hsu
*Assistant Examiner*—Ricky Q. Ngo
*Attorney, Agent, or Firm*—Sughrue, Mion, Zinn, Macpeak & Seas

[57]          ABSTRACT

In multiplexed data radio communication, especially (but not exclusively) in TDMA mode, a method is provided of offering optimized intelligent traffic channel sharing services, enabling data from a secondary source to be conveyed on a traffic channel assigned to a main source (20, 30, 40). Each of the blocks transmitted by the main source and the data from the secondary data source are defined by one of the least three relative levels of importance ($NI_p$=0, 1 or 2; $NI_s$=0, 1, or 2). Data from the secondary source is substituted for a block transmitted by the main source as the result of a comparison of the respective relative levels of importance of data from the secondary source and the block from the main source.

14 Claims, 3 Drawing Sheets

METHOD, TERMINAL AND INFRASTRUCTURE FOR SHARING CHANNELS BY CONTROLLED TIME SLOT STEALING IN A MULTIPLEXED RADIO SYSTEM

BACKGROUND OF THE INVENTION

The field of the invention is that of multiplexed data communication by radio, especially (but not, exclusively) using the TDMA (Time Division Multiple Access) technique.

The invention finds an advantageous application in cellular mobile radio systems, for example those to the GSM (Global System for Mobile Communications) standard. The invention has been specifically developed for PMR (Professional Mobile Radio) systems to the TETRA (Trans European Trunk Radio System) standard intended for networks used by emergency services (fire, police), taxi fleets, etc.

In this type of system calls that have been set up (i.e. are in stable mode) are conveyed by traffic channels (TCH). Each traffic channel is assigned a transmission frequency (or a set of frequencies in the GSM system, which uses the principle of frequency hopping). Several TCH share the same traffic frequency by time-division multiplexing between a plurality of mobile stations (typically four under the TETRA standard or eight at present under the GSM standard). Each mobile station communicates on one time slot of the multiplex.

Each call can convey either speech signals digitally coded at a low bit rate (below 16 kbit/s) and generally organized into "frames" or data as such, whether in circuit-switched mode (continuous transmission) or in packet-switched mode (continuous connection or using packets with their address in a header). Speech transmission is either full-duplex or half-duplex. In the latter case the mobile user must usually press a "push to talk" key to activate the up channel (from the mobile terminal to the radio communication infrastructure) in place of the down channel.

In a system like the TETRA system a call is assigned a time slot on an up frequency and a down frequency throughout the duration of a call (message trunking) or during transmission (transmission trunking).

It may be necessary temporarily to exceed the possible transmission rate on a traffic channel.

For example, it may be necessary to transmit signalling information relating to management of the traffic channel in question. The signalling information comprises instructions or parameters associated with network operation, for example.

A first known way to solve this problem is to increase the number of time slots assigned to the application. This technique is not the optimum, however, in that the secondary information sources transmit intermittently and at random and the reserved additional channels would be highly underused.

Another known way to solve this problem, used in the GSM system among other things to provide the signalling data transmission service, is to use a "frame stealing" technique whereby a speech or data frame is replaced with a signalling message. The signalling messages are preceded by a stealing flag and the receiver has means for noting the presence of the flag and therefore of recognizing that the frame received contains signalling. It can then carry out the operations to which the signalling message refers and "reconstruct" the missing traffic frame in the appropriate manner, according to whether it comprises speech or data.

This technique also has various drawbacks, however.

First of all, frame stealing is usually arbitrary i.e. authoritarian and without discrimination, being applied as and when the need arises. This causes deterioration of traffic information transmission quality.

Secondly, frame stealing is currently restricted to channel-associated signalling because of the deterioration in quality it causes. This technique could be applied to other services, however.

International patent application WO 91/02436 discloses the transmission of signalling data in a traffic channel set up when temporary cessation of activity is detected on said channel. This document also discloses triggering of a time delay in response to reception of a signalling message to establish a maximum duration on expiry of which the message must be transmitted. This time-delay depends on the urgency of the message. If a time-delay has expired and no cessation of activity has been detected on the traffic channel the message is transmitted anyway and disrupts the speech/data signal conveyed on the channel.

This document therefore provides only two levels of relative importance in respect of the traffic channel (signal transmission/cessation of signal transmission) and suggests the association with each signalling message to be transmitted of a time-delay which is dependent on the urgency of the message to be transmitted. The time-delay mechanisms described are used to define a null, predetermined or infinite maximum time-delay on expiry of which said signalling message must be transmitted. Assuming that more than two levels of relative importance are defined for the signal transmitted on the traffic channel, one of these levels is of no utility in the context of this document as there is merely associated initially with each signalling message a time-delay which implicitly defines only two levels of relative importance (zero time-delay and infinite time-delay). This document does not disclose any comparison of the respective levels of importance of the speech/data signal and the signalling message.

The article "Blank and burst transmission of data over active speech channels" by WONG et al. published in Electronics Letters, vol. 24, n° 11, 26 May 1988, describes a method of classifying speech segments whereby they can be omitted or not without disturbing the speech signal containing them. The document concerns the transmission of data on a traffic channel conveying a speech signal. The method is based on measuring a signal/segment reconstruction noise ratio.

SUMMARY OF THE INVENTION

An object of the invention is to remedy these drawbacks of the prior art.

To be more precise, a first object of the invention is to provide a method of inserting extra data into a traffic channel of a mobile radio system with minimum deterioration in transmission quality.

Another object of the invention is to provide a method of offering intelligent traffic channel sharing services, especially in the context of a "simultaneous" voice/data transmission service for virtually transparent overlaying of data on speech. For example, if a speech circuit is set up between two or more users, data blocks can be simultaneously sent to the same user(s) as the speech (e.g. transmission of data in packets in connection-oriented mode) or to other destinations (if the blocks include a destination address).

A further object of the invention is compatibility with an organization for managing the relative priority of data to be transmitted.

These objects, and others that emerge below, are achieved in accordance with the invention by means of a method of transmitting data in a digital radio system in which calls form main data sources and are transmitted in the form of data streams between terminal stations and an infrastructure, via traffic channels, said data streams being made up of a succession of data blocks, method of the type adapted to convey data from a secondary data source in a traffic channel assigned to a main data source, characterized in that each block transmitted by the main source and the data from said secondary data source are each defined by one of at least three levels of relative importance, and data from the secondary source is substituted for a block transmitted by the main source as the result of a comparison between the respective relative importance levels of said data from the secondary source and said block from the main source.

The invention therefore provides an "enhanced frame stealing" method which performs the intelligent substitution of intermittent secondary data for main traffic data transmitted on a traffic channel of a mobile radio system.

In the preferred application of the invention said traffic channel multiplex is a time-division multiplex in which each call is assigned a specific time slot, each time slot being adapted to convey an integer number of data blocks. The multiplexing can instead be frequency division multiplexing or any form of multiplexing in which the transmitted data is organized into successive data blocks.

If the main data source comprises speech signals, the relative importance detecting means can comprise a voice activity detector (detecting periods of silence in the speech signal), for example a detector of the type described in GSM standard 06.32. Frame stealing in a block of silence detected in this way causes virtually no deterioration. An evaluation analyzer of areas in which the speech signal is stationary, by measurement of the "spectral distance", can be used instead. In this case frame stealing causes only minimal deterioration.

If the main data source comprises sporadic data or data with an intermittent information content the relative importance level detecting means advantageously comprise a detector of pauses in transmission or any other appropriate analyzer.

If calls are conveyed by time-division multiplexing and each time interval is divided into at least two successive transmission blocks, said relative level of importance detection is advantageously carried out selectively, block by block. Said selective substitution of secondary data for primary data is also preferably carried out selectively, block by block, on the basis of said relative importance level information.

The data supplied by said secondary data source is advantageously stored in a FIFO buffer memory before it is transmitted block by block.

In an advantageous embodiment of the invention a maximal waiting time is assigned to at least some of the stored secondary data and said secondary data is preferably transmitted upon detection of the lowest level of activity prior to the end of said maximal waiting time, said data being transmitted immediately instead of main data regardless of its instantaneous activity level as soon as said maximal waiting time has expired.

Said secondary data may constitute, for example:

a data transmission service for sending messages of fixed small size, generally not more than one time slot, and containing the destination address explicitly or implicitly;

a data packet transmission service adapted to be connected to a speech service in the context of a concurrent voice and data call service;

"user signalling" information comprising encryption and/or synchronization information.

In other aspects the invention consists in a terminal or a radio system infrastructure implementing the above method.

The terminal or the infrastructure of the invention advantageously comprises:

at least two data sources each defining at least three levels of relative importance and belonging to a group comprising speech signals and data signals;

relative level of importance detecting means associated with said sources and supplying relative levels of importance;

flow control means receiving at their input said relative levels of importance and supplying at their output a parameter for choosing the data to be transmitted on the basis of comparison of the respective relative levels of importance of said sources; and transmission selection means connected to said sources and actuated by said information to be transmitted choice parameter to authorize selectively transmission of data from one source at a time.

In an embodiment of the invention in which the terminal or the infrastructure comprises at least two sources of application data or signals and at least one source of system data, the transmission selection means operated by said information to be transmitted choice parameter advantageously comprise two stages:

a first stage within which transmission of data from only one source of signals or application data at a time is selectively authorized;

a second stage in which transmission of data from the application source selected in the first stage or system data is selectively authorized.

BRIEF DESCRIPTION OF THE DRAWINGS

Other features and advantages of the invention will emerge from a reading of the following description of embodiments of the invention given by way of non-limiting illustrative example only and the appended drawings in which.

DESCRIPTION OF THE PREFERRED EMBODIMENTS

Figure 1:
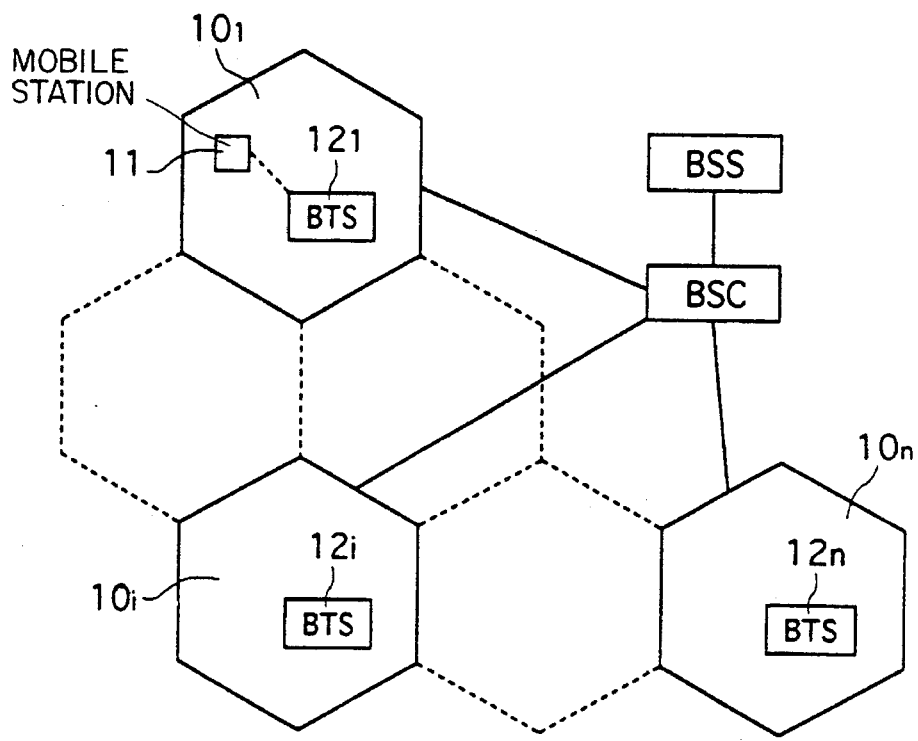
FIG. 1 is a schematic representation of a GSM or TETRA type cellular mobile radio network in which the method of the invention can be implemented.

Referring to FIG. 1, a cellular mobile radio network comprise a plurality of preferably adjacent cells $10_1$, $10_i$, $10_n$ covering a geographical area in which mobile stations 11 can move. In the example described in detail below the network referred to is a GSM or TETRA type network.

The mobile stations 11 in each cell $10_i$ set up calls with a base transceiver station (BTS) $12_i$ for the cell $10_i$ concerned. In am GSM type network the base transceiver stations BTS are under the control of a base station controller (BSC) in turn supervised by a base station subsystem (BSS); for background information reference may usefully be had to "The GSM System for Mobile Communications" by M. MOULY and M. B. PAUTET, ISBN 2-9507190-0-7, and to the GSM specifications.

In the case of TETRA systems, the standard does not specify the internal architecture of the infrastructure but the transmit-receive equipments of the infrastructure are also referred to as "base transceiver stations" (BTS) in this document.

Calls set up between a base transceiver station $12_1$ and a mobile station 11 in the cell $10_1$ concerned can use various channels, including:

a bidirectional traffic channel (TCH) conveying either user information in the form or speech or data signals;

a fast associated control channel (FACCH).

Figure 2:
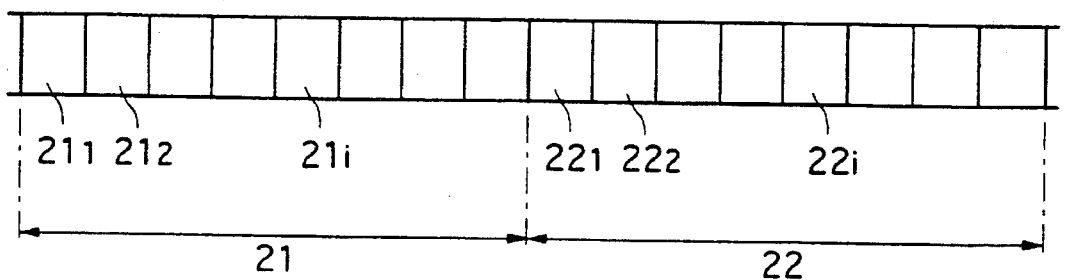
FIG. 2 shows the structure of a typical frame conveying time-division multiplexed bidirectional traffic channels (TCH).

In the illustrative example described here, the connections are time-division multiplexed. Consequently, as shown in FIG. 2, the bidirectional calls are conveyed by a time-division multiplex whose successive frames 21, 22 are formed by time slots $21_1$, $21_2$, . . . ; $22_1$, $22_2$, . . . each containing at least one communication channel. In TETRA systems each frame comprises four time slots (there are eight time Slots in GSM frames).

As a result, each call is conveyed in segments in time slots $21_i$, $22_i$, . . . in the same numerical position in several frames 21, 22 of the multiplex.

Note, however, that the invention is relatively independent of the characteristics of the radio interface and in particular is equally applicable to FDMA and TDMA systems. Generally speaking, the invention is applicable to any radio system in which the frame stealing technique must be used to convey traffic channel associated signalling or to transmit data over voice.

The prior art "frame stealing" technique consists in substituting data which has suddenly acquired a high priority for that of the call in progress in one or more time slots. The invention can firstly be used to enhance the grade of service by reducing the deterioration which is usually caused by frame stealing.

Secondarily, however, the same technique can be used to implement true sharing of traffic channels between signalling requirements and speech and data transmission applications, and it is specifically intended that it should be used in TETRA systems for "short message" or "concurrent voice/data" type services by overlaying the data on the speech in a quasitransparent manner. Because of the channel characteristics in existing Cellular mobile radio systems (in TETRA systems, narrowband transmission at 400 MHz on 25 kHz wide channels) the authorized speech or data bit rates are in the order of 4 800 bit/s.

It may be necessary to transmit at higher bit rates, for example to transmit high bit rate data or to transmit speech and data simultaneously.

Figure 3:
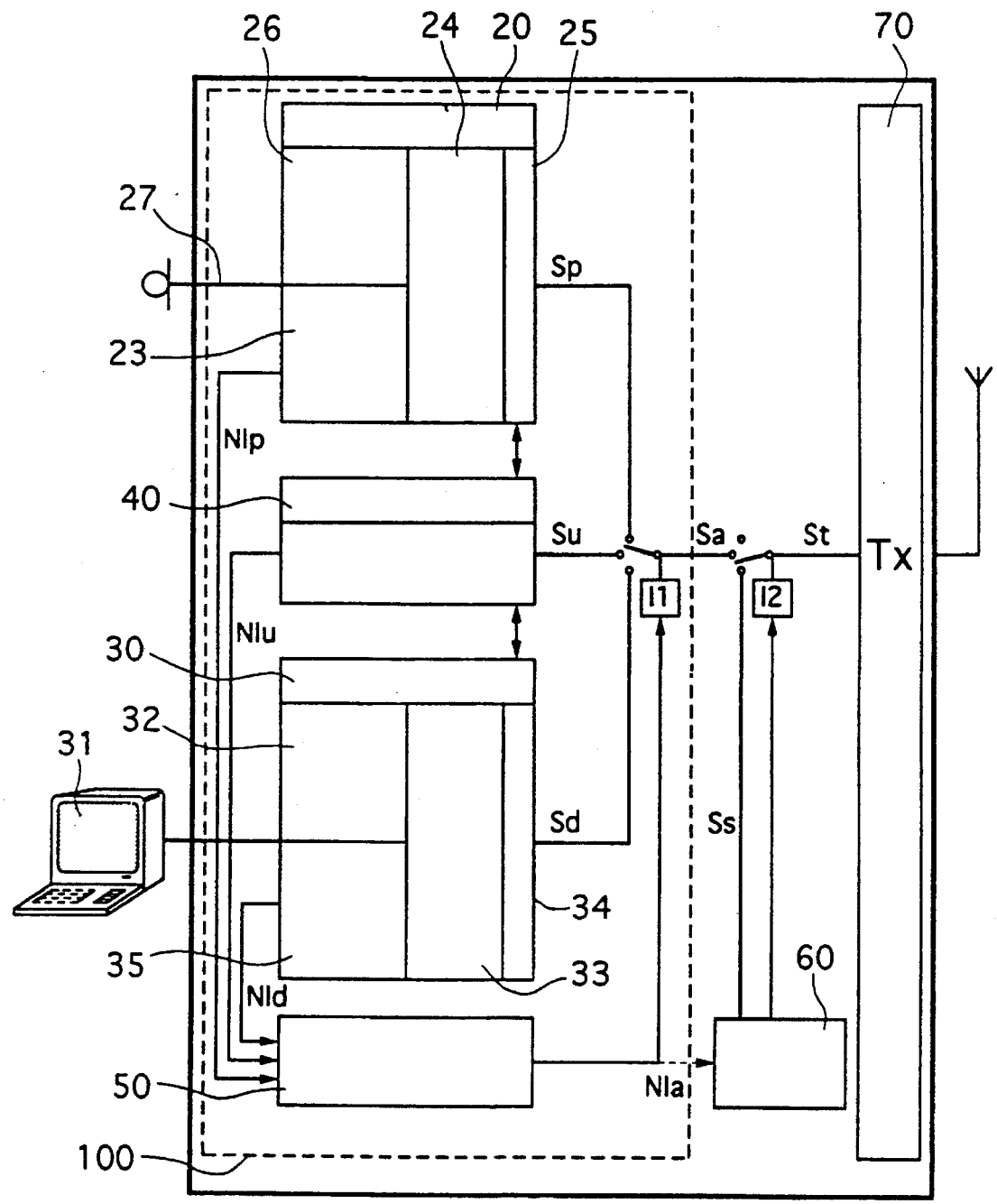
FIG. 3 shows a functional block diagram of a radio terminal implementing the method of the invention.

FIG. 3 shows a functional block diagram of a mobile terminal implementing the method of the invention.

This design has various functional modules which are also features of prior art systems, namely:

a SPEECH unit 20 which supplies at its output a speech signal $S_p$. This unit 20 receives a speech signal 27, digitizes it and codes it by means of a low bit rate speech coder 26. After speech encoding 26 the signal is processed by a channel coder 24 which adds redundancy to protect against transmission errors, after which the signal is interleaved 25.

a DATA unit 30 which supplies at its output a data signal $S_d$. This unit 30 provides the interface to data transmission equipment 31 (PC, fax, etc) and carries out the necessary bit rate adaptation before passing the signal to the channel coder 33 and for interleaving 34.

a USER SIG unit 40 which manages end-to-end signalling $S_u$ exchanged between applications of different terminals. This signalling is related to the requirements of the user and is not intercepted by the system. It includes information concerning the encryption mode and its synchronization, for example. This information must be sent from time to time (e.g. at one second intervals) to enable users joining an encrypted group call in mid-call to decrypt the received signal.

a SYSTEM SIG unit 60 which manages the signalling information to be sent for system control purposes. This type of signalling is intended to be intercepted by the system and interpreted as including control messages. This information includes information exchanged with the infrastructure during handover (changing cell during a call).

a transmit (Tx) unit 70 which receives the signal $S_t$ to be transmitted on the traffic channel for each transmission period and performs the modulation and radio transmission functions. The signal flows (binary data) are shown in bold line in the figure. They are generated in the form of regular size data blocks. This size is called the "transmission period" in this document and normally corresponds to the size of the frames used by the speech coder (typically 20 ms to 30 ms). In a system such as the TETRA system, the period will probably be 30 ms (to be confirmed, since the coder has not yet been decided on), which corresponds to the content of half a time slot in the TDMA structure. There will therefore be two speech frames per time slot, or more generally two signal blocks per time slot.

In a conventional system operating in speech mode the SPEECH unit 20 generates successive signal blocks $S_p(n)$, $S_p(n+1)$, etc. The USER SIG unit 40 arbitrarily replaces some of the signal blocks with a user signalling block $S_u(n)$ without concerning itself with the importance of the content of the speech blocks. Similarly, the SYSTEM SIG unit 60 then arbitrarily replaces some of the blocks $S_a(n)$ generated by the application with blocks $S_s(n)$ according to system signalling needs. This arbitrary "frame stealing" causes deterioration of speech quality. The DATA unit 30 cannot be active at the same time as speech or must use a different traffic channel, which increases the use of radio resources and makes the terminal more complex as it then has to manage several traffic channels simultaneously.

In a terminal of the invention, as shown in FIG. 3, an APPLICATION subsystem 100 contains the SPEECH functional unit 20, the USER SIG functional unit 40 and the DATA functional unit 30, to which additional functions have been added, and an additional APPLICATION CONTROL unit 50. The additional units specific to the invention are as follows:

the SPEECH unit 20 now includes a voice activity detector (VAD) 23 which detects speech/silence and possibly evaluates the degree to which the signal is stationary. A VAD of the same type as is used in the GSM system, as described in GSM recommendations 06.31 and 06.32, can be used. The voice activity detector 23 can use the parameters of the speech coder 26 to evaluate the degree to which the signal is stationary using a spectral distance measurement and to adapt the energy thresholds used for speech/silence detection.

The DATA unit 30 now comprises an "Activity analyzer" subunit 35 which either detects the presence or the absence of the wanted signal to be transmitted or receives this information from the data transmission equipment 31; it also manages a buffer memory containing the data blocks to be transmitted.

The APPLICATION CONTROL unit 50 is specific to a terminal of the invention and shares the traffic channel between the various data streams generated by the three units 20, 30, 40. It receives from each of these three units a parameter NI indicating the relative level of importance of the block to be transmitted: $NI_p$ for speech, $NI_u$ for user signalling and $NI_d$ for data. It uses these three parameters to decide which type of signal (speech/user signalling/data) must be sent on the traffic channel for the current transmission period and sets the switch I1 accordingly. It also calculates a parameter $NI_a$ indicating the level of importance of the signal transmitted by the application and sends this to the SYSTEM SIG unit 60.

The SYSTEM SIG unit 60 also implements an intelligent "frame stealing" function specific to the present invention: depending on the parameter $NI_a$ and on constraints specific to system signalling, it decides which type of signal (signal from application/system signalling) must be sent on the traffic channel for the current transmission period and sets the switch I2 accordingly.

The essential feature of the invention is that frame stealing is "intelligent" rather than arbitrary. In the APPLICATION subsystem 100 traffic channel sharing is controlled by the APPLICATION CONTROL unit 50 which determines the type of signal to be sent for each transmission period: $S_a(n)=S_p(n)$ or $S_a(n)=S_u(n)$ or $S_a(n)=S_d(n)$. The SYSTEM SIG unit 60 then determines, also in an "intelligent" manner, the signal block to be transmitted on the traffic channel: $S_t(n)=S_a(n)$ or $S_t(n)=S_s(n)$.

A terminal of the invention typically operates as follows: during a voice call periods of silence ("gaps") and areas of the speech signal in which the signal is stationary are given preference for transmitting user signalling or system signalling. This considerably reduces deterioration due to frame stealing. The same criterion is also used to transmit data if the user requires this. The data is sent by the data transmission equipment 31 to the terminal using flow control. The terminal stores the data in a buffer memory and then transmits it block by block by stealing speech frames in periods of silence or stable areas of the speech signal.

Preferred modes of operation of the APPLICATION CONTROL unit 50 and the SYSTEM SIG unit 60 for sharing traffic channels will now be described by way of non-limiting example, along with detailed examples of the criteria which can be used to control frame stealing effectively.

Operation of the APPLICATION CONTROL Unit 50

The function of this unit is to determine which type of signal ($S_p$, $S_u$ or $S_d$) must be sent by the application for each transmission period and to set the switch I1 accordingly. To this end it uses the parameters $NI_p$, $NI_u$ and $NI_d$ which indicate the relative level of importance of the ! signals sent by the SPEECH unit 20, the USER SIG unit 40 and the DATA unit 30, respectively:

$NI_p$ typically has three values:
  0 in periods of silence, background noise and no speech;
  1 in areas of the speech signal in which the signal is stable (or stationary);
  2 in areas of transition or variation of the speech signal.

$NI_u$ typically has three values:
  0 in the absence of any user signalling to be transmitted;
  1 in the presence of user signalling to be transmitted;
  2 in the presence of urgent user signalling to be transmitted.

$NI_d$ typically has three values:
  0 in the absence of any data to be transmitted;
  1 in the presence of data to be transmitted;
  2 in the presence of urgent data to be transmitted.

The APPLICATION CONTROL unit 50 then typically uses the following rules to manage a speech call with pending data and user signalling:

Normally $S_a=S_p$ (speech is transmitted by default); If $NI_u=1$ or 2 and $NI_p=0$ or 1 then $S_a=S_u$ (signalling is transmitted during areas of silence or stable areas);

If $NI_d=1$ or 2 and $NI_p=0$ and $NI_u=0$ then $S_a=S_d$ (data is transmitted during periods of silence and in the absence of user signalling);

If $NI_d=2$ and $NI_p=1$ and $NI_u=0$ then $S_a=S_d$ (urgent data can be transmitted during stable areas if there is no user signalling);

If $NI_u=2$ then $S_a=S_u$ (urgent user signalling can steal important speech frames ($NI_p=2$), but this constitutes an exceptional case);

If $NI_p=1$ or 2 and the frame is stolen ($S_a=S_u$ or $S_a=S_d$) then $NI_p=2$ for the next N transmission periods so that frame stealing can be spread out and quality improved, typically with N=5 frames.

The APPLICATION CONTROL unit 50 can also use information from the SYSTEM SIG unit 60.

If it is known that the frame will be stolen for system signalling ($S_f=S_s$) there is no use in the application placing in it user signalling or data, and so the situation is left unchanged: $S_a=S_p$;

If a speech frame stolen for system signalling is important ($NI_p=1$ or 2) then $NI_p=2$ for the next N transmission periods, for the same reasons as above.

The APPLICATION CONTROL unit 50 calculates for each transmission period a parameter $NI_a$ which typically has three values and which is transmitted to the SYSTEM SIG unit in the following manner:

Normally $NI_a=NI_p$ (by default);

If the speech frame is stolen by the application for user signalling or data ($S_a=S_u$ or $S_a=S_d$) then $NI_a=2$.

Operation of the SYSTEM SIG Unit 60

The function of the SYSTEM SIG unit 60 is to determine for each transmission period the type of signal to be transmitted on the traffic channel (application signal $S_a$ or system signalling $S_s$) and to set the switch I2 accordingly. It uses for this purpose the parameter $NI_a$ and an internal parameter $NI_s$:

$NI_a$ is sent by the APPLICATION CONTROL unit 50 and typically has three values:
  0 if the block is not important;

1 if the block is not very important;

2 if the block is important.

$NI_s$ typically has three values:

0 if system signalling is absent;

1 if system signalling is present;

2 if urgent system signalling is present.

The SYSTEM SIG unit 60 then determines the type of signal to be sent on the traffic channel on the basis of predefined rules, as follows:

Normally $S_t=S_a$ (the application signal is transmitted by default);

If $NI_s=1$ or 2 and $NI_a=0$ or 1 then $S_t=S_s$ (system signalling is transmitted if the application signal is not important or not very important);

If $NI_s=2$ then $S_t=S_s$ (urgent system signalling is always transmitted immediately).

Urgent/non-urgent classification of user signalling, system signalling and data blocks is also possible. Such classification can be based partly on the initial urgency of the block and also on the waiting time of the block. For example, a message that is initially not urgent may become urgent if it has not been sent before a predetermined time interval elapses. Three relative levels of importance (0, 1 and 2) can be provided for signalling or data messages (very urgent, urgent and non-urgent); and Leach message can be transmitted only if its relative level of importance is greater than the relative level of importance of the speech signal as expressed by three states: 0, 1 and 2 (no speech, stable area and speech signal variation). Of course, the invention can also be used in the simpler situation in which the call does not include speech, so that only a data transmission service uses the traffic channel. Data transmission is usually bursty (sporadic) and it is very rare for data to be transmitted in a continuous stream over a long period of time. A terminal of the invention will transmit user signalling or system signalling blocks during pauses in data transmission.

In another embodiment of the invention the method can be used to share traffic channels not in the upward transmission direction, i.e. from the terminal to the infrastructure (in which case the method is implemented in the terminal, in the manner described up to now), but rather in the downward transmission direction. The infrastructure also has to send system signalling frequently to the terminal. The design of a radio relay station of the invention is somewhat similar to that of the FIG. 3 terminal, but simpler in that the relay station does not comprise any APPLICATION subsystem 100. It receives the signal $S_t$ sent by the sending terminal and has means for recognizing whether this is system signalling ($S_s$) or a signal from the application ($S_a$). This distinction can be based on a bit indicating that the frame is stolen (stealing flag) or on other transmission characteristics (the TETRA system uses two different learning sequences to distinguish between system signalling and traffic data from the application). After disinterleaving and channel decoding, followed by re-encoding and interleaving, the signals blocks $S_t$ are retransmitted by the relay station to the receiving terminal(s). However, some blocks must be replaced by system signalling blocks addressed to the receiving terminal(s). In accordance with the invention, frame stealing in the downward transmission system is carried out intelligently under the control of the SYSTEM SIG unit of the transmitter part of the relay station.

Figure 4:
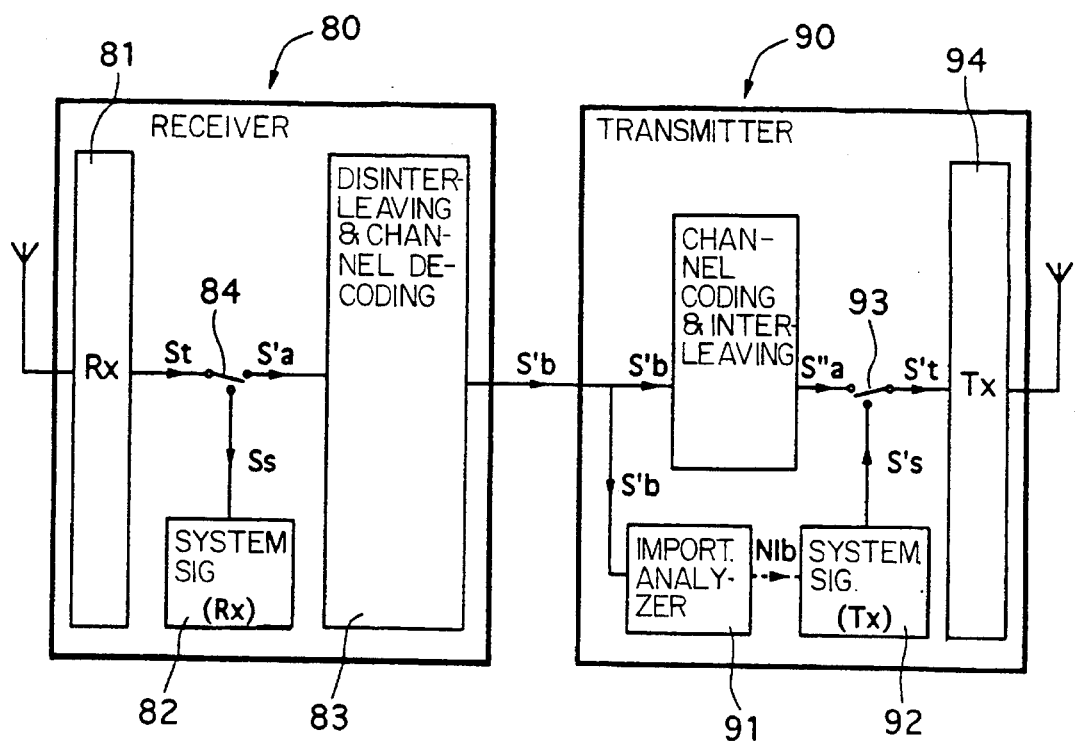
FIG. 4 shows a functional block diagram of the component parts of a base transceiver station of a radio infrastructure implementing the method of the invention.

FIG. 4 shows the receiver part 80 and the transmitter part 90 of a base transceiver station in this situation. In the most general case the signal received is retransmitted, after processing, in a different cell of the network (multicell network) and two different stations 80, 90 are involved. If the mobiles are in the same cell the receiver 80 and the transmitter 90 shown in the figure are part of the same base transceiver station.

After processing by the radio receive (Rx) subsystem 81, the received signal $S_t$ is identical to that sent by the terminal (see FIG. 3), apart from transmission errors. The system signalling blocks are identified and recovered (84) by the SYSTEM SIG (Rx) unit 82 which interprets the commands received and acts accordingly. The other blocks constitute the signal $S'_a$ identical to the signal $S_a$ from the terminal in the absence of system signalling and excluding transmission error problems. After disinterleaving and channel decoding (83) the signal $S'_b$ is recovered and passed to the transmitter part 90 of the base transceiver station.

The signal $S'_b$ includes "stuffing" blocks for plugging gaps caused by system signalling in the upward direction.

Some blocks of the signal $S'_b$ can be marked "wrong" if the "CHANNEL DECODING" function 83 detects errors in the block (using well-known procedures for this).

In the transmitter part 90 of the base transceiver station the signal $S'_b$ is passed to an "IMPORTANCE ANALYZER" 91 which determines the relative level of importance of each block of the signal $S'_b$ using the following criteria alone or in combination:

the stuffing blocks (filling "gaps" left by the system signalling in the upward direction) and the "wrong" blocks are of no utility whatsoever to the receiving terminal and they are therefore assigned the lowest level of relative importance, when the signal $S'_b$ has been decoded, the content of each block can be examined to deduce its relative importance (provided that there is no encryption). For a speech service, for example, access is available to the coder parameters and it is therefore possible to detect voice activity (a posteriori) or even to perform a stability analysis, as in the speech unit of the terminal. More simply, a technique analogous to the discontinuous transmission mode (DTX) technique of the GSM system (see GSM recommendation 06.12) can be used. In this case the blocks of silence detected by the VAD of the terminal do not have the same format as the active speech blocks. They contain a smaller number of parameters for updating the comfort noise generated at the receiver and are completed with an identification field.

The identification field comprise a certain number of bits assuming known values (all at binary zero, for example) chosen so that this combination is virtually impossible in active speech. A simple analysis of this field therefore identifies blocks of silence to which a low level of importance is assigned. In the case of data, it would also be possible to identify empty blocks by marking them (at the sending terminal) using a specific identification field.

The "IMPORTANCE ANALYZER" unit 91 therefore uses these criteria to determine a level of importance parameter NIb which it transmits to the "SYSTEM SIG" unit 92 for each block of data. The "SYSTEM SIG" unit 92 then uses this parameter NIb (and the priority of the downward system signalling $S'_s$) to control a switch 93 switching between the signal $S''_a$ (derived from $S'_b$ after channel decoding and interlacing) and the signal $S'_s$. The resulting signal $S'_t$ is then sent to the radio transmission (Tx) subsystem 94 for transmission to the destination terminals.

I claim:

1. A method of transmitting data in a digital radio system wherein calls form a main data source, and are transmitted in the form of data streams between terminal stations (11) and an infrastructure (10, 12) via traffic channels, said data streams comprise a succession of data blocks, a secondary data source is assigned to said main data source, and said data blocks of said main data source and data of said secondary data source are conveyed in a traffic channel assigned to said main data source, said method comprising the steps of:

defining each of said data blocks transmitted by said main data source and said data from said Secondary data source by one of at least three levels of relative importance ($NI_p=0$, 1 or 2; $NI_s=0$, 1 or 2) to determine respective relative importance levels;

making a comparison of said respective relative importance levels of said data from said secondary data source with said respective relative importance levels of said data blocks of said main data source; and replacing one of said data blocks transmitted by said main data source with data from said secondary source on the basis of said comparison.

2. Method according to claim 1 characterized in that said main data source (20) transmits speech signals and in that a level of relative importance ($NI_p$) defining a data block is supplied by relative level of importance detector means (23) comprising vocal activity detectors detecting periods of silence in the speech signal and analyzers for evaluating areas in which the speech signal is stationary.

3. Method according to claim 1 characterized in that said main data source (30, 40) comprises data of intermittent information content and in that said relative level of importance detector means (35) comprise a transmission pause detector.

4. Method according to claim 1 characterized in that said traffic channel multiplex is a time-division multiplex in which each call is assigned a specific time slot and in that each time slot can convey an integer number of data blocks.

5. Method according to claim 4 characterized in that each time slot is divided into at least two consecutive transmission blocks and in that the relative levels of importance are defined selectively block by block.

6. Method according to claim 4 characterized in that each time slot is divided into at least two consecutive transmission blocks and in that operations to substitute secondary source data for main source data are effected selectively block by block.

7. Method according to claim 1 characterized in that data supplied by said secondary data source is stored in a FIFO buffer memory before it is substituted for a main source data block.

8. Method according to claim 7 characterized in that a maximum waiting time is assigned to at least some of the stored secondary data, said data being transmitted immediately instead of main source data regardless of the instantaneous level of relative importance of said main source data as soon as said maximal waiting time has elapsed.

9. Method according to claim 1 characterized in that said secondary source data constitutes a data transmission service adapted to transmit messages with a short fixed size, generally one time slot at most, and containing its destination address explicitly or implicitly.

10. Method according to claim 1 characterized in that said secondary source data constitutes a data packet transmission service adapted to be connected to a speech service in the context of a concurrent voice/data service.

11. Method according to claim 1 characterized in that said secondary source data comprises user signalling information including encryption and/or synchronization information.

12. Method according claim 1 characterized in that the digital radio system comprises a radio communication system according to the TETRA standard.

13. Terminal or infrastructure for implementing the method according to claim 1 characterized in that it comprises:

at least two data sources (20, 30, 40) each defining at least three levels of relative importance (0, 1, 2) and belonging to a group comprising speech signals ($S_p$) and data signals ($S_u$, $S_d$);

relative level of importance detecting means (23, 35) associated with said sources and for supplying relative levels of importance ($NI_p$, $NI_u$, $NI_d$, $NI_a$; $NI_b$);

flow control means for receiving at their input said relative levels of importance ($NI_p$, $NI_u$, $NI_d$, $NI_a$; $NI_b$) and supplying at their output a parameter for choosing the data to be transmitted on the basis of comparison of the respective relative levels of importance of said sources; and transmission selection means (I1, I2; 93) connected to said sources and actuated by said choice parameter, said information to be transmitted to authorize selectively transmission of data from one source at a time ($S_p$, $S_u$, $S_d$, $S_s$; $S''_a$; $S'_s$).

14. Terminal according to claim 13 characterized in that it comprises at least two sources of signals or application data (20, 30, 40) and at least one source of system data (60), and in that the transmission selection means (I1, I2) actuated by said choice parameter in said information to be transmitted are divided into two stages:

a first stage (100) within which transmission of data from only one source of signals or application data (20, 30, 40) at a time is selectively authorized (I1);

a second stage in which transmission of data from the application source ($S_a$) selected in the first stage or system data ($S_s$) is selectively authorized (I2).

* * * * *